United States Patent Office 2,776,259
Patented Jan. 1, 1957

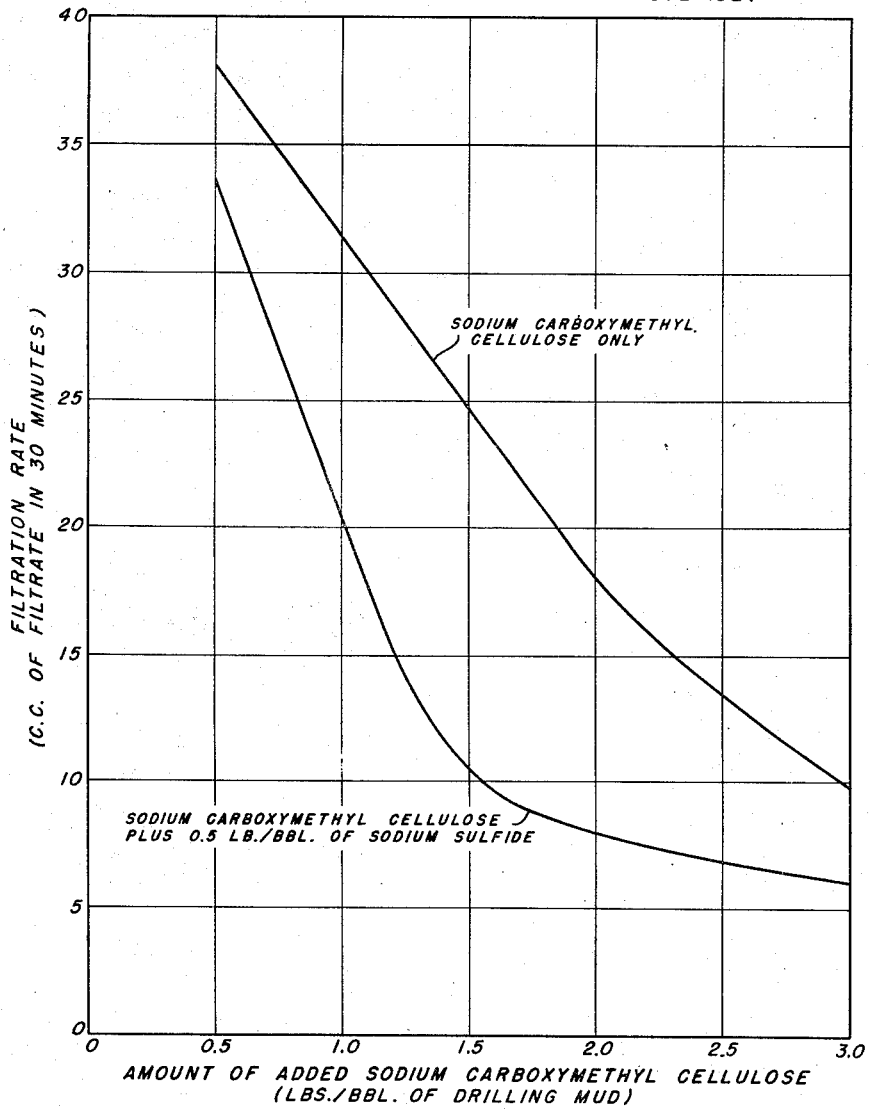

2,776,259

DRILLING MUDS

Richard A. Salathiel, Houston, Tex., assignor, by mesne assignments, to Esso Research and Engineering Company, Elizabeth, N. J., a corporation of Delaware Application September 28, 1955, Serial No. 537,143

15 Claims. (Cl. 252—8.5)

The present invention is directed to a suspension of finely divided solids in an aqueous medium for use in well drilling operations and a method of preparing same. More particularly, the invention is directed to a drilling mud having a low filtration rate. In its more specific aspects, the invention is directed to a drilling mud to which has been added materials for reducing filtration rate.

The present invention may be briefly described as involving a drilling mud comprising at least 5% by weight of finely divided solids in an aqueous saline medium to which has been added about 1 to 5 pounds per 42 gallon barrel of mud of an alkali metal carboxyalkylcellulose and about 0.5 to about 5 pounds per 42 gallon barrel of mud of an additive taken from the group consisting of water soluble alkali metal sulfides, polysulfides and hydrosulfites.

In the rotary method of drilling boreholes, an aqueous suspension of finely divided solids, commonly referred to as a drilling mud, is pumped down the drill stem through the openings in the drill bit and upwardly through the annular space between the drill stem and the wall of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficulty permeable coating or filter cake on the walls of the borehole for the purpose of reducing loss of water from the borehole to the formation and thereby reducing softening of the borehole walls and caving into the drill hole. It is preferable that the filter cake formed on the walls of the borehole be thin rather than thick so as to avoid mechanical difficulties in moving the bit in and out of the hole and in placing casing in the hole.

The aqueous suspensions of finely divided solids employed as drilling fluids in rotary drilling operations are sometimes prepared by admixing suitable amounts of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells may be obtained by forming a suspension in water of surface clay at or adjacent the well site or may be prepared in the process of drilling by dispersing in water the cuttings produced from the borehole. Weighting materials, clays, and chemicals may, of course, be added to the drilling fluid prepared in the last mentioned manner.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which have a relatively low filtration rate may be prepared from borehole cuttings; however, it has generally been found necessary to incorporate filtration reducing agents into the mud to impart this desirable property thereto. It is common practice to employ alkali metal carboxalkylcelluloses such as sodium carboxymethylcellulose, potassium carboxymethylcellulose, lithium carboxymethylcellulose, sodium carboxyethylcellulose, potassium carboxyethylcellulose, lithium carboxyethylcellulose, etc. and mixtures thereof for this purpose. While the addition of such materials has proved beneficial, there has been much to be desired in the way of performance, particularly with respect to the reduction of filtration rate when the aqueous medium is an aqueous saline medium It is, therefore, an object of the present invention to provide a dispersion or suspension of finely divided solid material in an aqueous saline medium having little tendency to lose water by filtration therefrom. Another object of the present invention is to provide a drilling fluid suitable for use in the rotary drilling of boreholes into subsurface formations and having a low filtratoin rate. Another object of the present invention is to provide an agent which, on addition to the aqueous, saline drilling fluid used in the drilling of boreholes into subsurface formations, will substantially reduce the loss of water therefrom by filtration. A further object of the present invention is to provide an agent which, an addition to a saline drilling fluid, will substantially reduce the loss of water therefrom by filtration, but which will not increase excessively the viscosity of the fluid or substantially affect its ability to maintain solids in suspension.

The present invention may be described as relating to a drilling mud composition, a method of preparing such drilling mud composition and a well drilling process employing the drilling mud composition of the present invention.

The composition of the present invention comprises an aqueous saline vehicle having dispersed or suspended therein at least 5% by weight of a finely divided solid material to which has been added an alkali metal carboxyalkylcellulose and an additive taken from he group consisting of water soluble alkali metal sulfides, polysulfides, and hydrosulfites in amounts sufficient to substantially reduce the tendency of the suspension or dispersion to lose water by filtration therefrom.

The finely divided solid material to be used in accordance with the present invention may, of course, be any finely divided solid which is capable of being dispersed or suspended in an aqueous saline liquid vehicle. The finely divided solid material employed in the practice of the present invention will ordinarily include clay, such as colloidal clay bodies. For example, I may use in my drilling mud or aqueous suspension, colloidal clays, such as Wyoming bentonite, El Paso surface clay, medium yield drilling clays from Texas, clays containing the montmorillonites and especially sodium montmorillonite. The calcium montmorillonite clays may be employed and clays containing other suitable cationic combinations of the montmorillonites may be used. Sodium montmorillonite such as that encountered in Wyoming bentonite is included in the preferred type of clay. I also contemplate that I may use in the practice of my invention muds such as those produced when clayey subsurface formations are drilled. For example, mud such as that obtained from a drilling well in Lake Raccourci in Louisiana may be found entirely suitable. Likewise, I may employ in my invention dried ground shale such as has been obtained from a well in West Cote Blanche Bay in southern Louisiana. There may also be added weighting materials such as barytes, barium sulfate, calcium carbonate, silica, etc. and other conventional additives including pH control agents, dispersants, etc., including water soluble carbonates, phosphates, borates, etc. The amount of solids (including clay, weighting agents, etc.) to be used may range from about 5% by weight of the mud up to as high as about 75% by weight.

The drilling muds of the present invention should also contain an alkali metal carboxyalkyl-cellulose of the type mentioned above. Satisfactory cellulose derivatives of this nature will normally contain about 0.5 to about 1 alkali metal carboxyalkyl substituent group per glucose anhydride unit of the cellulose chain molecule. In accordance with a preferred mode of the present invention, the cellulose derivative will contain about 0.7 to about 0.9 alkali metal carboxyalkyl substituent groups per glucose anhydride unit.

In addition, the drilling mud of the present invention should contain an additive taken from the group consisting of water soluble alkali metal sulfides, polysulfides and hydrosulfites. Representative additives of this nature which may be used alone or in admixture include sodium sulfide, potassium sulfide, sodium and potassium disulfide, trisulfide, tetrasulfide, etc., sodium hydrosulfite, potassium hydrosulfite, etc.

The alkali metal carboxyalkylcellulose should normally be employed in an amount within the range of about 1 to 5 pounds per 42 gallon barrel of mud and the alkali metal sulfide, polysulfide, or hydrosulfite is preferably employed in an amount within the range of about 0.5 to about 5 pounds per 42 gallon barrel of drilling mud. It is to be understood, of course, that the amount of alkali metal carboxyalkylcellulose and the amount of additive required to give the desired reduction in filtration loss from a suspension of finely divided solids in an aqueous saline liquid vehicle will vary with circumstances over a comparatively wide range, in that the amounts of such materials to be employed in a specific suspension or dispersion will depend upon the characteristics of the finely divided solids to be employed in the drilling mud and the circumstances under which the drilling mud is to be used.

The alkali metal carboxyalkylcellulose and the alkali metal sulfide, polysulfide, or hydrosulfite may be incorporated into the drilling mud in any of the suitable manners known to those skilled in the art. When it is desired to reduce the filtration rate of a drilling mud, the materials aforementioned or, in some situations, solutions thereof may be incorporated into the drilling mud at any suitable point in the mud circulation system such as in the mud pit. In some situations it may be desirable to use a mixing device such as a cone and jet mixer or the equivalent thereof for incorporating the aforementioned materials into the drilling mud.

The present invention may also be considered in connection with the following specific examples which are given by way of illustration and not as limitations on the scope of this invention.

The figure is a graphic representation of the improvement obtainable with respect to filtration rate when a water soluble alkali metal sulfide, polysulfide, or hydrosulfite is added to a drilling mud containing an alkali metal carboxyalkylcellulose, as compared to the filtration rate obtainable in the absence of a water soluble alkali metal sulfide, polysulfide, or hydrosulfite.

EXAMPLE 1

A drilling mud composition was prepared by incorporating clay, in this instance a commercial blend of crude native Texas bentonite (crude calcium montmorillonite) with Wyoming bentonite (sodium montmorillonite) into an aqueous vehicle, said vehicle having dissolved therein about 5 weight percent of salt. The drilling mud composition comprised about 20 weight percent of the commercial clay, about 80 weight percent of the saline vehicle and also contained about 0.5 weight percent of sodium carbonate. A portion of the thus prepared drilling mud was tested for viscosity, initial gel strength and filtration rate. Other portions of the drilling mud were modified by the addition of a commercial sodium carboxymethylceluiose containing about 0.7 to about 0.9 sodium carboxymethyl groups per glucose anhydride unit and the thus modified compositions were similarly tested. In addition, further portions of the drilling mud were modified through the addition of both the caboxymethylcellulose and sodium sulfide and were likewise tested. The compositions prepared and the results obtained are set forth in Table I.

Table I

EFFECTS OF SODIUM CARBOXYMETHYLCELLULOSE AND SODIUM SULFIDE ON PROPERTIES OF A 5 PERCENT SALT-WATER MUD

| Composition | Amount of Sodium Carboxymethylcellulose Added, Lb./Bbl. of Active Material | Sodium Sulfide Added, Lb./Bbl. | Mud Properties | | |
|---|---|---|---|---|---|
| | | | Viscosity at 600 R. P. M. Stormer cps. | Initial Gel Strength, Grams Stormer | API Filtration Rate, cc. in 30 Minutes |
| 1 | 0 | 0 | 16 | 18 | 34.0 |
| 2 | 0.5 | 0 | 25 | 18 | 38.0 |
| 3 | 1.0 | 0 | 32 | 15 | 31.4 |
| 4 | 2.0 | 0 | 28 | 2 | 17.6 |
| 5 | 3.0 | 0 | 27 | 0 | 9.8 |
| 6 | 0.5 | 0.5 | 23 | 22 | 33.6 |
| 7 | 1.0 | 0.5 | 21 | 5 | 20.4 |
| 8 | 2.0 | 0.5 | 24 | 0 | 8.5 |
| 9 | 3.0 | 0.5 | 35 | 0 | 5.5 |
| 10 | 1.0 | 0.25 | 27 | 9 | 29.0 |
| 11 | 1.0 | 1.0 | 20 | 3 | 14.6 |

From Table I it will be seen that the unmodified drilling mud (composition 1) had a filtration rate of about 34.0, that the addition of about 0.5 pound of sodium carboxymethylcellulose per barrel of drilling mud adversely affected the filtration rate (composition 2) and that it was necessary to use about 2 pounds of sodium carboxymethylcellulose per barrel of drilling mud (composition 4) in order to obtain a substantial reduction in filtration rate.

With respect to composition 6 it is to be noted that the addition of about 0.5 pound of sodium carboxymethylcellulose and the addition of about 0.5 pond of sodium sulfide did not materially reduce the filtration rate. However, with respect to composition 7, a substantial reduction in filtration rate was obtained when about 1 pound of sodium carboxymethylcellulose and about 0.5 pound of sodium sulfide per barrel of drilling mud was employed.

It is further to be noted, with respect to compositions 10 and 11, that through the use of about 1 pound of sodium carboxymethylcellulose and about 0.25 and 1.0 pound per barrel, respectively, of sodium sulfide a substantial reduction in filtration rate was obtained.

The results obtained with respect to compositions 1 to 10 are graphically represented in Fig. 1 of the drawings. From Fig. 1 it will be noted that a substantial reduction in filtration rate is obtainable with respect to saline drilling muds containing alkali metal carboxymethylcellulose such as sodium carboxymethylcellulose when an alkali metal sulfide such as sodium sulfide is also added to the drilling mud.

Equally satisfactory results are obtainable with other water soluble alkali metal sulfides and with water soluble alkali metal polysulfides and alkali metal hydrosulfites. Thus, a substantial reduction in filtration rate is obtainable if sodium tetrasulfide or sodium hydrosulfite is substituted for the sodium sulfide and Example I is otherwise repeated. Similarly, a substantial reduction in filtration rate is obtained when potassium sulfide is substituted for the sodium sulfide and Example 1 is otherwise repeated.

What is claimed is:

1. A drilling mud comprising at least 5% by weight of finely divided solids in an aqueous saline medium to which has been added from about 1 to about 5 pounds per 42 gallon barrel of mud of an alkali metal carboxyalkylcellulose and from about 0.1 to about 5 pounds per 42 gallon barrel of mud of an additive taken from the group consisting of water soluble alkali metal sulfides, polysulfides and hydrosulfites, said alkali metal carboxyalkylcellulose and said additive having been added in amounts sufficient to materially reduce the tendency of the drilling mud to lose water by filtration, said alkali metal carboxyalkylcellulose containing from about 0.7 to about 0.9 alkali metal carboxyalkyl substituent groups per glucose anhydride unit.

2. A drilling mud as in claim 1 wherein the alkali metal carboxyalkylcellulose is sodium carboxymethylcellulose.

3. A drilling mud as in claim 2 wherein the additive is an alkali metal sulfide.

4. A drilling mud as in claim 3 wherein the alkali metal sulfide is sodium sulfide.

5. A composition as in claim 2 wherein the additive is an alkali metal hydrosulfite.

6. A drilling mud as in claim 5 wherein the alkali metal hydrosulfite is sodium hydrosulfite.

7. A drilling mud as in claim 2 wherein the additive is an alkali metal polysulfide.

8. A drilling mud comprising at least 5% by weight of finely divided solids in an aqueous medium to which has been added about 1 to about 5 pounds of an alkali metal carboxyalkylcellulose per 42 gallon barrel of mud and about 0.1 to about 5 pounds per 42 gallon barrel of mud of an additive taken from the group consisting of water soluble alkali metal sulfides, polysulfides and hydrosulfites.

9. A drilling mud as in claim 8 wherein the alkali metal carboxyalkylcellulose is sodium carboxymethylcellulose and the additive is sodium sulfide.

10. A drilling mud as in claim 8 wherein the alkali metal carboxyalkylcellulose is sodium carboxymethylcellulose and the additive is sodium hydrosulfite.

11. In a process for drilling a well with well drilling tools wherein there is circulated in the well a salt water based drilling mud containing at least about 5% by weight of finely divided solids, the method of forming a filter cake on the wall of said well to decrease the loss of water into a permeable formation penetrated by said well which comprises incorporating from about 1 to about 5 pounds per 42 gallon barrel of mud of an alkali metal carboxyalkylcellulose and from about 0.1 to about 5 pounds per 42 gallon barrel of mud of an additive taken from the group consisting of water soluble alkali metal sulfides, polysulfides and hydrosulfites into said drilling mud, said alkali metal carboxyalkylcellulose and said additive being incorporated in amounts sufficient to substantially lower the filtration rate of said mud and contacting said wall of said well with the resulting drilling mud to form said filter cake thereon.

12. A process as in claim 11 wherein the alkali metal carboxyalkylcellulose is sodium carboxymethylcellulose and wherein the additive is an alkali metal sulfide.

13. A process as in claim 12 wherein the alkali metal sulfide is sodium sulfide.

14. A method as in claim 11 wherein the alkali metal carboxyalkylcellulose is sodium carboxymethylcellulose and the additive is an alkali metal hydrosulfite.

15. A process as in claim 14 wherein the alkali metal hydrosulfite is sodium hydrosulfite.

References Cited in the file of this patent

UNITED STATES PATENTS

| | | |
|---|---|---|
| 1,588,956 | Feldenheimer | June 15, 1926 |
| 2,481,545 | Wagner et al. | Sept. 13, 1949 |
| 2,536,113 | Wagner | Jan. 2, 1951 |

OTHER REFERENCES

Searle: "The Chemistry and Physics of Clays and Other Ceramic Materials," 1924 ed., pages 247 and 249.